US007055195B2

(12) United States Patent
Roussy

(10) Patent No.: US 7,055,195 B2
(45) Date of Patent: Jun. 6, 2006

(54) PATIENT BED WITH CPR SYSTEM

(75) Inventor: Richard B. Roussy, London (CA)

(73) Assignee: Carroll Hospital Group, Inc., London (CA)

( * ) Notice: Subject to any disclaimer, the term of this patent is extended or adjusted under 35 U.S.C. 154(b) by 39 days.

(21) Appl. No.: 10/875,335

(22) Filed: Jun. 25, 2004

(65) Prior Publication Data

US 2005/0283914 A1 Dec. 29, 2005

(51) Int. Cl.
*A61G 7/18* (2006.01)
*F16H 3/06* (2006.01)
*F16H 55/02* (2006.01)

(52) U.S. Cl. ........................ 5/616; 74/89.38; 74/424.78

(58) Field of Classification Search ............... 74/89.23, 74/89.38, 405, 424.78; 5/616, 424
See application file for complete search history.

(56) References Cited

U.S. PATENT DOCUMENTS 3,913,153 A 10/1975 Adams et al.
4,435,862 A * 3/1984 King et al. ..................... 5/611
4,559,655 A 12/1985 Peck
4,667,354 A 5/1987 Carey, Jr. et al.
4,751,754 A 6/1988 Bailey et al.
4,769,584 A * 9/1988 Irigoyen et al. ............ 318/648
4,953,243 A 9/1990 Birkmann
5,129,116 A * 7/1992 Borders et al. ................ 5/617
5,195,198 A * 3/1993 Travis ........................... 5/618
5,317,769 A * 6/1994 Weismiller et al. ............ 5/610
5,329,657 A 7/1994 Bartley et al.
5,423,097 A 6/1995 Brule et al.
5,444,880 A 8/1995 Weismiller et al.
5,481,769 A * 1/1996 Schneider ...................... 5/617
6,158,295 A * 12/2000 Nielsen ..................... 74/89.38
6,226,816 B1 5/2001 Webster et al.
6,566,833 B1 5/2003 Bartlett
6,654,974 B1 12/2003 Ruehl et al.
2003/0172459 A1 9/2003 Roussy

OTHER PUBLICATIONS

"Actuator LA31 Careline", Linak LA31 product specification by Linak.

* cited by examiner

*Primary Examiner*—Michael Trettel
(74) *Attorney, Agent, or Firm*—Raggio & Dinnin, P.C.

(57) ABSTRACT

An electrically activated emergency system for a patient bed comprises: an electrically powered linear actuator for driving a back rest of the patient bed from a lowered back rest position to a raised back rest position and operable to permit the back rest to lower from the raised back rest position to the lowered back rest position without being driven by the linear actuator; and, an independent emergency back rest lowering feature comprising an electrical activation means for activating the linear actuator to permit the back rest to lower from the raised back rest position to the lowered back rest position without being driven by the linear actuator, the electrical activation means not requiring continued operator attendance for continued lowering of the back rest. The present invention permits an attendant, for example a nurse, to press a single button to bring the back rest to a lowered back rest position without having to keep the button pressed so that the attendant is free to immediately begin administering emergency procedures while the back rest is lowering.

12 Claims, 7 Drawing Sheets

PATIENT BED WITH CPR SYSTEM

FIELD OF THE INVENTION

The present invention relates to patient beds, particularly to adjustable patient beds for healthcare facilities, such as hospitals and long-term care facilities. In particular, the present invention relates to an emergency system for such beds.

BACKGROUND OF THE INVENTION

Patient beds in healthcare facilities are designed so that various parts of the bed can adopt a number of positions to provide for greater patient comfort and/or to facilitate the tasks of an attendant, for example a nurse. For example, beds may be raised or lowered to different heights. Patient support platforms may be tilted to achieve the Trendelenburg and reverse Trendelenburg positions. Patient support platforms may comprise back rests and/or knee rests that can be raised or lowered to support a patient's back and knees in a variety of positions.

Adjusting the position of the bed or parts of the bed may be accomplished by a variety of means, for example, by mechanical, hydraulic and electrical means and combinations thereof. Purely mechanical means, including linkages, gears, cranks, etc., have traditionally been used but generally require manual power for their operation. Consequently, physical limitations of the bed's operator represent significant limitations to the design of beds where position changes are accomplished solely by mechanical means. The additional use of hydraulics permits bed design where the physical limitations of the operator are less of a factor. However, the use of electrical components, for example motors, switches, electronic controllers, etc., in combination with mechanical and/or hydraulic components has greatly simplified the design and use of patient beds throughout the healthcare industry. Beds designed with electrical components permit extensive operation of the bed with minimal operator effort.

Electrically operated patient beds are generally equipped with a plurality of switches to control the various adjustments that can be made to the bed. Switches are often localized on a single control panel for easy access by an operator. Where access to the switches by the patient is undesirable, the control panel may be located in an area of the bed that is normally inaccessible to the patient in the bed, for example, on the outside face of the foot board.

Despite the flexibility offered by the use of electrical components, there remains limitations, often driven by regulatory considerations, to the use of electrical components in patient beds. Thus, in a number of instances, mechanical means are still used for some operations of the bed. This is particularly evident in the design of emergency systems for patient beds.

Design of medical electrical equipment is regulated by International Standards. In particular, two standards applicable to electrically operated patient beds are:

UL 2601-1, the Underwriters Laboratories Inc. Standard for Safety, Medical Electrical Equipment, Part 1: General Requirements for Safety (1997); and, IEC 601-2-38 International Standard, Medical Electrical Equipment—Part 2: Particular requirements for the safety of electrically operated hospital beds (1996).

According to Section 22.4 of UL 2601-1,

"Movements of EQUIPMENT or EQUIPMENT parts which may cause physical injury to the PATIENT shall be possible only by the continuous activation of the control by the OPERATOR of these EQUIPMENT parts."

According to Section 22.4.101 of IEC 601-2-38,

"Electrically powered functional movements of the BED shall be possible only by means of MOMENTARY CONTACT SWITCHES."

Momentary Contact Switch is defined in Section 2.1.106 of IEC 601-2-38:

"Control device which initiates and maintains operation of operating elements only as long as the control (actuator) is actuated. The manual control (actuator) returns automatically to the stop position when released. MOMENTARY CONTACT SWITCHES are also known as "hold-to-run control devices"."

In an emergency situation, for instance when a patient has a heart attack or goes into shock, an attendant must quickly perform emergency procedures on the patient, for example CPR (cardiopulmonary resuscitation). However, a patient in a patient bed, may be in any number of positions at the onset of the emergency. For instance, the back and knee rests may be raised so that the patient is in a sitting position, for example, to watch television, to eat, etc. In such an instance, it is necessary for the back and knee rests to be lowered quickly to a flat position so that emergency procedures may be administered more effectively. It is desirable, therefore, that the bed have a system by which the back and knee rests may be lowered quickly to the flat position, while at the same time permitting the attendant to begin administering emergency procedures.

However, in light of the above-noted standards, all electrical control of moving parts on an electrically operated patient bed has heretofore been by way of momentary contact switches. Since momentary contact switches turn off the functioning of a moving part when the switch is released, electrical activation of an emergency system on a patient bed has been heretofore considered impossible within the context of the above-noted standards. Instead, emergency systems on patient beds have been designed to activate manually, even on beds otherwise electrically operated, in order to remain within the above-noted standards.

Therefore, there is a need in the art for an electrically activated emergency system on a patient bed, which meets the regulatory requirements of the standards governing electrically operated patient beds.

SUMMARY OF THE INVENTION

According to an aspect of the present invention, there is provided an emergency system for a patient bed comprising: an electrically powered linear actuator operable to drive a back rest of the patient bed from a lowered back rest position to a raised back rest position, and operable to permit the back rest to lower from the raised back rest position to the lowered back rest position without being driven by the linear actuator; and, an independent electrical activation means for activating the linear actuator to permit the back rest to lower from the raised back rest position to the lowered back rest position without being driven by the linear actuator, the electrical activation means not requiring continued operator attendance for continued lowering of the back rest.

According to another aspect of the present invention, there is provided a patient bed comprising a patient support platform having a back rest portion; an electrically powered linear actuator operable to drive the back rest from a lowered back rest position to a raised back rest position, characterized in that the linear actuator is operable to permit the back rest to lower from the raised back rest position to the lowered back rest position without being driven by the linear actuator; and, the bed further comprises an emergency back rest lowering system comprising an independent electrical activation means for activating the linear actuator to permit the back rest to lower from the raised back rest position to the lowered back rest position without being driven by the linear actuator, the electrical activation means not requiring continued operator attendance for continued lowering of the back rest.

The patient support platform generally comprises a hard support surface and may also comprise a mattress, sheets, blankets or other bedding to provide greater comfort to the patient. A patient support platform useful in the present invention has a back rest portion. The back rest may be raised from a lowered position to a raised position so that a patient is able to sit up in the bed, for example, to watch television, to eat, etc. Conversely, the back rest may be lowered from the raised position to the lowered position. For administering emergency procedures, for example CPR, the lowered position is preferably a flat position in respect of the patient support platform. The raised position may be any position between the lowered position and a maximum raised position. It is clear to one skilled in the art that the back rest may also be raised and lowered between positions intermediate between the lowered position and the maximum raised position.

The patient support platform may also have a knee rest portion and/or other portions that may be adjustable to provide different options for patient positioning on the patient support platform. Raising and lowering the knee rest and/or other portions of the support platform is similar to that described for the back rest.

The patient support platform is generally supported on the ground or floor by a support means. There are numerous suitable ways in the art for supporting a patient support platform on the ground or floor. For example, U.S. patent Publication 2003/0172459 published Sep. 18, 2003, the disclosure of which is herein incorporated by reference, describes a suitable leg arrangement for supporting a patient support platform.

In electrically operated patient beds, various parts of the bed may be adjusted to achieve various positions. Positional adjustment may be accomplished by a variety of means known in the art. Electrically powered linear actuators are particularly preferred in patient beds of the present invention. Linear actuators may adjust the height of the bed, for example as disclosed in U.S. patent Publication 2003/0172459. Linear actuators may also be used to adjust the position of the back rest, knee rest and other portions of the patient support platform. A single linear actuator may be used to adjust a number of features, however, it is preferred to use a linear actuator for each feature to be adjusted. Thus, the back rest and knee rest are each preferably adjusted by its own linear actuator.

A linear actuator useful in the present invention is operable to drive the back rest from a lowered back rest position to a raised back rest position, and operable to permit the back rest to lower from the raised back rest position to the lowered back rest position without being driven by the linear actuator. Thus, the linear actuator drives the back rest when it is being raised but does not actually drive the back rest when it is being lowered. The back rest lowers only under an applied external force, such as gravity, the weight of the patient, etc. As a consequence, lowering of the back rest is not an electrically powered functional movement of the bed that may cause injury, and is therefore not subject to the standards described above. This aspect of the linear actuator surprisingly may be utilized in an electrically activated emergency system that meets the standards described above. A particularly preferred electrically powered linear actuator is a Linak™-LA31 having a spline feature.

Control of electrically powered linear actuators is accomplished by electrical activation means. The term "electrical activation means" in this context encompasses any component that may be used in a control circuit that functions using electricity, for example, switches, timers, microprocessors, voltage regulators, logic gates, and any other electrical or electronic components. Such components may be embodied in software of a controller. Electrical power to operate all electrical functions of the bed may be supplied by the main power of a building and/or by an internal power supply (e.g. a battery).

While the emergency system of the present invention and other control systems of the bed may share various common elements, activation of the emergency system is independent of activation of the other control systems. Other control systems include the systems that control the raising and lowering of the back rest and knee rest under normal conditions. Thus, the electrical activation means for the emergency system may comprise its own switch, whereby triggering the switch activates the linear actuator to permit the back rest to lower from the raised back rest position to the lowered back rest position. Preferably, a single, dedicated user operated switch activates all elements of the emergency system. For example, triggering one switch may cause both the back rest and a knee rest to lower. The switch may be any suitable type, for example, push button switches, leaf switches, etc. The switch may be located anywhere on or off the bed. For example, the switch may be conveniently located on a control panel or a control pendant containing other control switches for the bed. The switch may be hard wired in the emergency system's control circuit or signals from the switch may be sent to the control circuit wirelessly.

It is an important aspect of the emergency system of the present invention that the electrical activation means does not require continued operator attendance for continued functioning. As stated above, the standard for electrically powered beds requires that electrically powered functional movements of the bed be possible only by means of momentary contact switches that stop the movement when the switch is released. Therefore, it is surprising to one skilled in the art that an electrically activated emergency system, such as the emergency system provided by the present invention, can work without momentary contact switches that stop the linear actuators when the switch is released.

Preferably, the electrical activation means comprises a timer for continuing to provide a signal so that the linear actuator is powered for at least a maximum time required for the back rest to achieve the lowered back rest position. The timer frees an operator to immediately begin administering emergency procedures to the patient (e.g. CPR) rather than attending to the activation means until the back rest reaches the lowered back rest position. The maximum length of time depends on the type of bed and the type of linear actuator. For example, for a bed of the type described in U.S. patent Publication 2003/0172459 and a Linak™-LA31 having a spline feature, the maximum time required to lower the back rest to the lowered back rest position is about 8 seconds. In this case, the timer should be set for at least 8 seconds, and may be set for longer. A setting of from about 8–20 seconds is preferred, particularly about 15 seconds.

Limit switches may also be used to cut power to electrically activated components of the emergency system and/or other electrically operated parts of the bed. In such instances, movement of a moving part beyond a pre-selected point would trip a limit switch to cut electrical power to the moving part. Limit switches are generally used as an added safety measure, to reduce power consumption, etc.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

Figure 1:
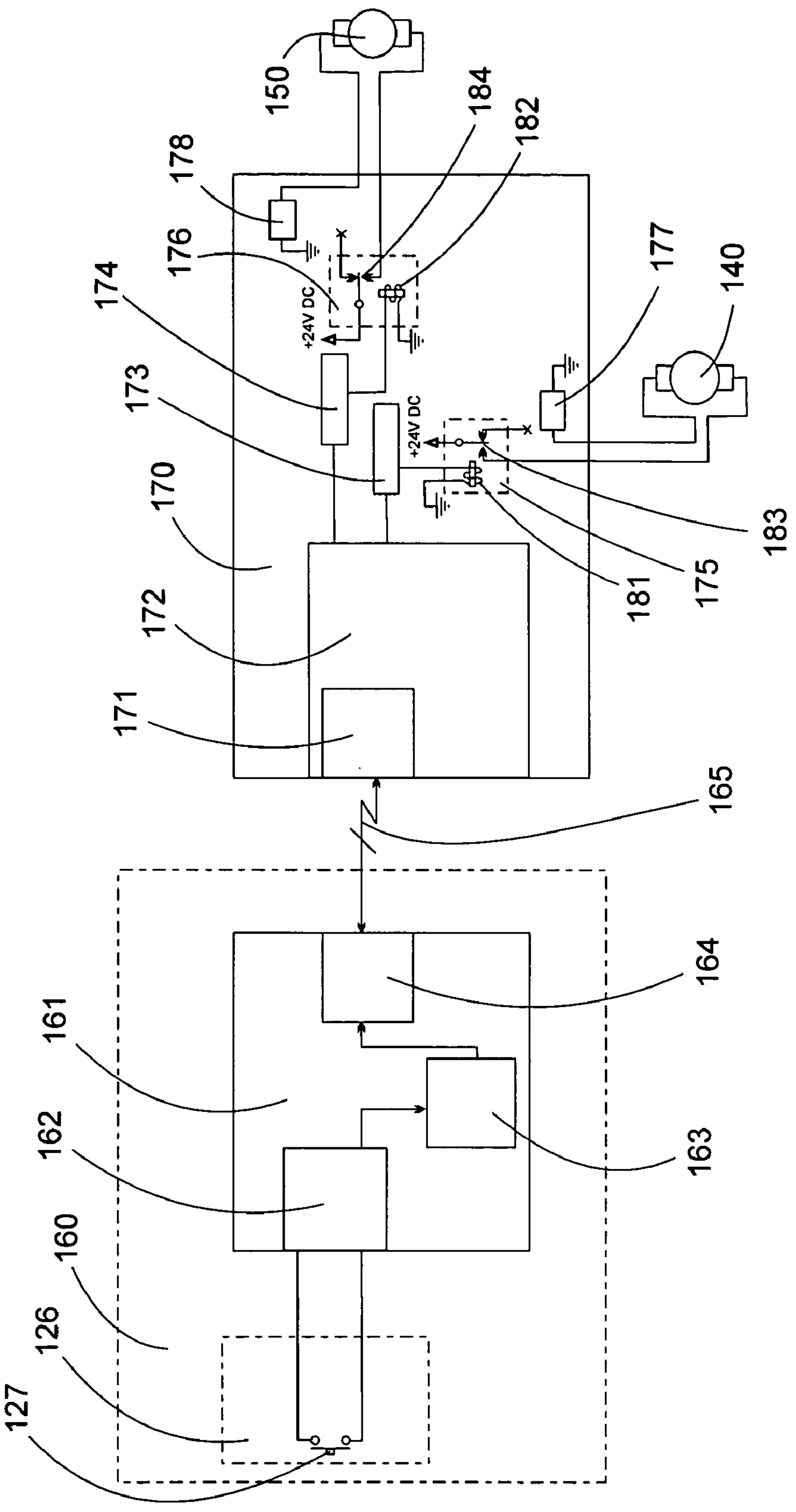
FIG. 1 is an electrical schematic of an emergency system of the present invention.

Referring to FIG. 1, an electrical schematic of an emergency system of the present invention is depicted. A single push-button emergency switch 127 is located on a control panel 126 on a foot board of an electrically operated patient bed. Associated with the control panel 126 is a control panel microcontroller 161, which together form a foot board staff control unit 160. Other control buttons (not shown) are also on the control panel 126 and are associated with the control panel microcontroller 161. The control panel microcontroller 161 comprises, among other elements (not shown), a button decoder 162, a timer 163 and a first UART serial port 164. In an emergency situation, an attendant pushes the emergency switch 127 thereby sending a signal to the button decoder 162 which is programmed to distinguish between the buttons on the control panel. Having determined that the emergency switch 127 was pushed, the button decoder 162 sends a signal to the timer 163 which is programmed to continue sending the signal for 15 seconds. The signal goes from the timer 163 to the first UART serial port 164 and is carried by a wire 165 to an actuator control box 170 located elsewhere on the bed.

The actuator control box 170 comprises, among other elements (not shown), a second UART serial port 171 in an actuator microcontroller 172, and two sets of NPN transistors 173,174, relays 175,176 and field effect transistors (FET) 177,178. The signal carried by the wire 165 enters the actuator microcontroller 172 at the second UART serial port 171. The actuator microcontroller 172 recognizes the signal as one intended to operate a first linear actuator 140 and a second linear actuator 150. The first linear actuator 140 operates a back rest of the bed and the second linear actuator 150 operates a knee rest of the bed. From the actuator microcontroller 172, the signal is sent to the NPN transistors 173,174, which power the coils 180,181 of the relays 175,176. Powering the coils 181,182 activates armatures which pull down on contacts 183,184 thereby permitting 24V DC power to flow to the linear actuators 140,150. The field effect transistors 177,178 momentarily keep the circuit open when the contacts 183,184 close in order to prevent arcing in the contacts. Power to the linear actuators 140,150 drives motors in the linear actuators which permits lowering of the back and knee rests as described below. Fifteen seconds after the emergency switch 127 is pushed, the timer 163 terminates the signal. The linear actuators 140,150 may switch off before the timer 163 terminates the signal since the linear actuators may reach the fully retracted position before the 15-second time period elapses. The 15-second time period is programmed into the timer 163 to allow ample time for the linear actuators to reach the fully retracted position.

Figure 2:
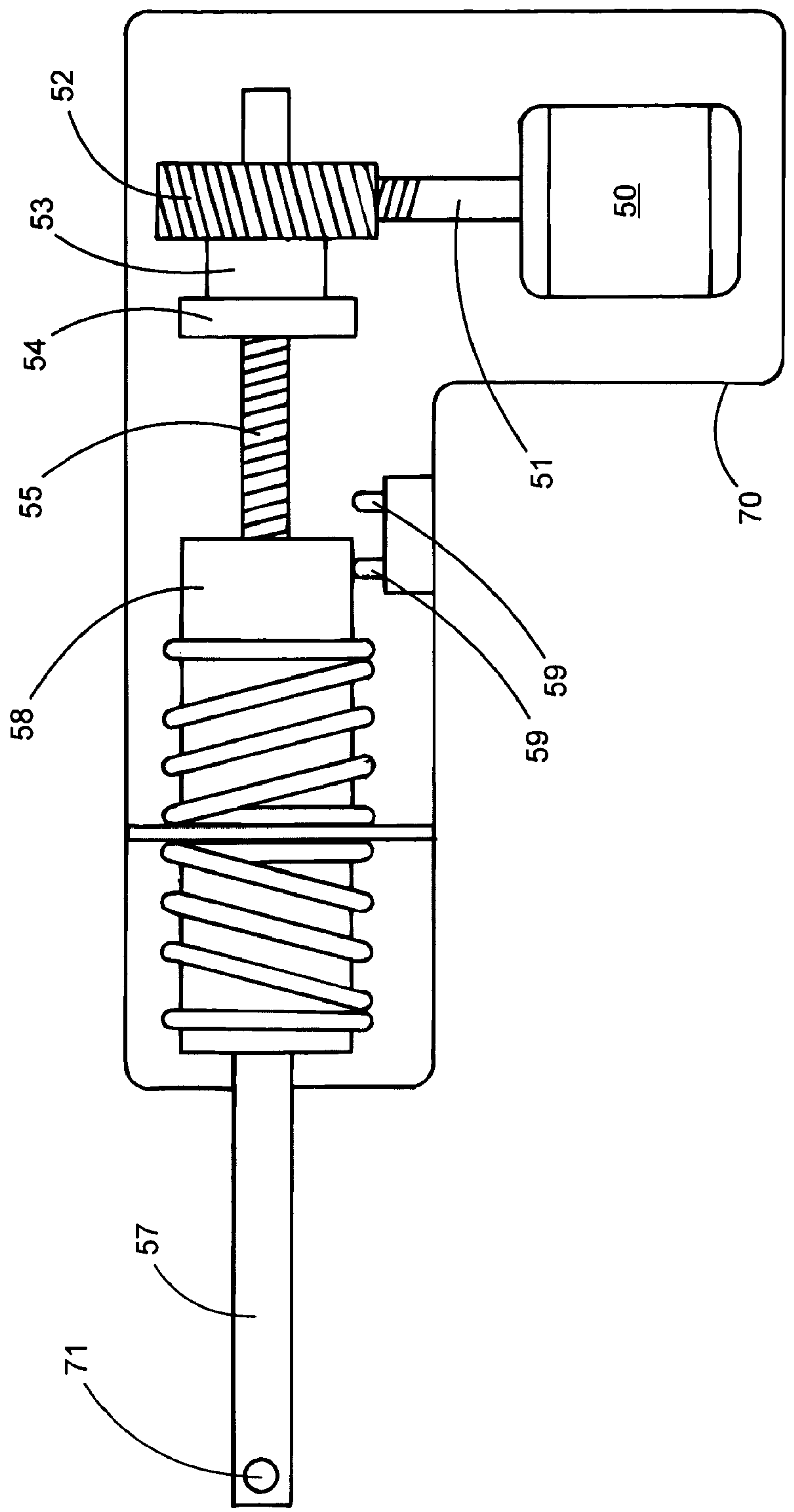
FIG. 2 is a schematic drawing of a linear actuator useful in an emergency system of the present invention.

Referring to FIG. 2, a linear actuator having a disengaging spline is depicted. A DC motor 50 drives a worm gear 51 which in turn drives a bevel gear 52. The bevel gear 52 is connected to a flexible clutch 53 which is connected to a ball bearing spindle mount 54. The spindle mount is connected to a lead screw 55. Rotation of the bevel gear 52 causes rotation of the lead screw 55. The lead screw 55 is disengageably connected to a hollow steel piston rod 57 by a disengaging spline (not shown). Part of the lead screw, the disengaging spline and part of the piston rod are housed in an outer tube 58. End stroke limit switches 59 are mounted near one end of the outer tube 58. A casing 70 houses most of the elements of the linear actuator. The piston rod 57 comprises an eye 71 at one end for connection to bed elements which raise and lower the back or knee rest.

Figure 3:
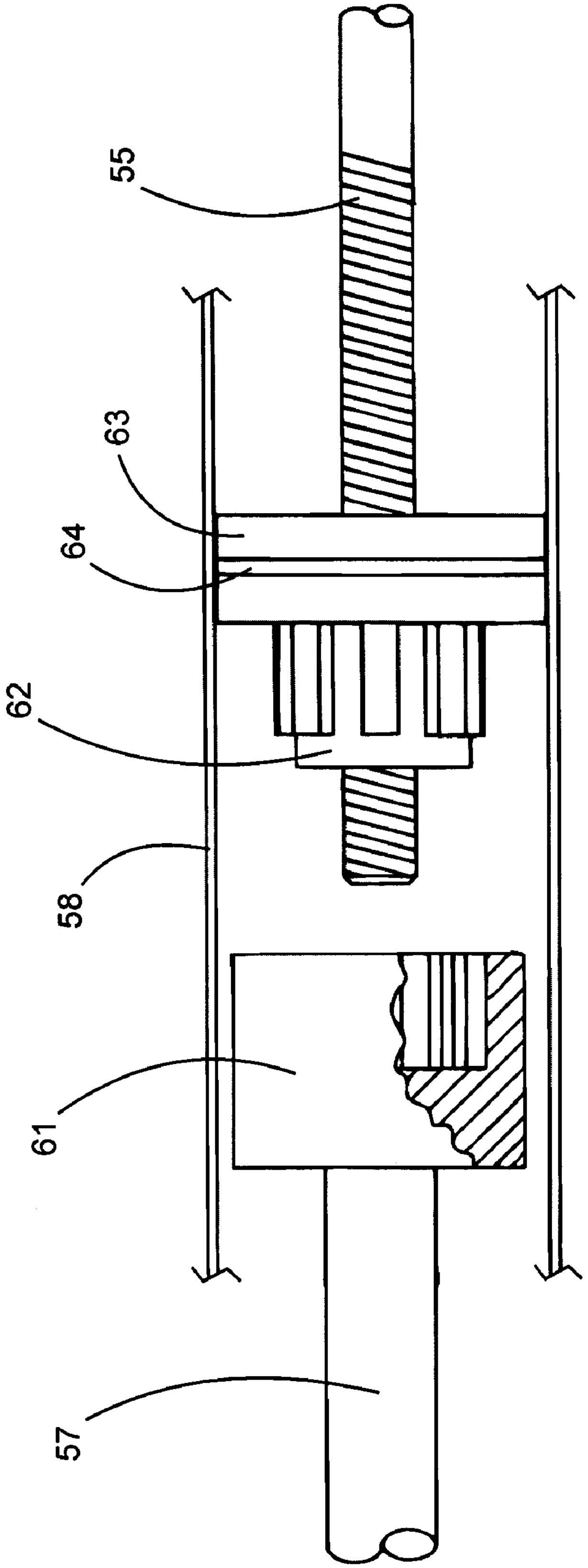
FIG. 3 is a schematic drawing of a disengaging spline of the linear actuator of FIG. 2.

Referring to FIG. 3, a schematic drawing of the disengaging spline of the linear actuator of FIG. 1 is shown in context with the lead screw 55, piston rod 57 and outer tube 58. The disengaging spline comprises a female part 61 connected to the piston rod 57, and a male part 62 on a lead screw nut 63 threaded on to the lead screw 55. The lead screw nut 63 comprises an O-ring 64 for sealing against the inside of the outer tube 58. For clarity, FIG. 3 depicts the male part 62 and the female part 61 of the disengaging spline in a disengaged position.

Referring to FIGS. 2 and 3, when the lead screw 55 is driven in a forward (extending) direction (to the left in FIGS. 2 and 3), and the male part 62 of the disengaging spline on the lead screw nut 63 is seated in the female part 61 of the disengaging spline, the lead screw nut 63 cannot rotate. Instead, the lead screw 55 rotates in a threaded portion inside the lead screw nut 63 driving the lead screw nut forward thereby driving the piston rod 57 forward. Since the piston rod is connected to bed elements which raise the back or knee rest, the back or knee rest is thereby raised. When the lead screw 55 is driven in a reverse (retracting) direction (to the right in FIGS. 2 and 3), the lead screw nut 63 threads in the retracting direction along the lead screw 55 and the male part 62 of the disengaging spline disengages from the female part 61. Therefore, the piston rod 57 is not driven in the retracting direction and the piston rod 57 only moves in the retracting direction by virtue of applied forces (e.g. the weight of the patient, weight of the back or knee rest, etc.). Movement of the piston rod 57 by such applied forces keeps the female part 61 of the disengaging spline seated in the male part 62. Use of the disengaging spline means that the piston rod is not attached to the lead screw nut and that the piston rod is free to move independently of the lead screw nut. Therefore, during lowering of the back or knee rest, an applied force on the back or knee rest in the opposite direction, such as when the back or knee rest meets an obstacle, will cause the male part 62 to disengage from the female part 61. The male part continues along with the lead screw nut 63 while the female part stays with the piston rod 57 which cannot move due to the opposite applied force. In fact, it is possible to physically lift the back or knee rest to a raised position even while the linear actuator is causing the lead screw nut 63 to travel in the reverse (retracting) direction.

At the end of the forward and reverse strokes of the linear actuator, the outer tube 58 is urged forward and backward respectively thereby triggering limit switches 59 which cut power to the motor 50 to automatically stop the linear actuator at the end of each stroke.

Figure 4A:
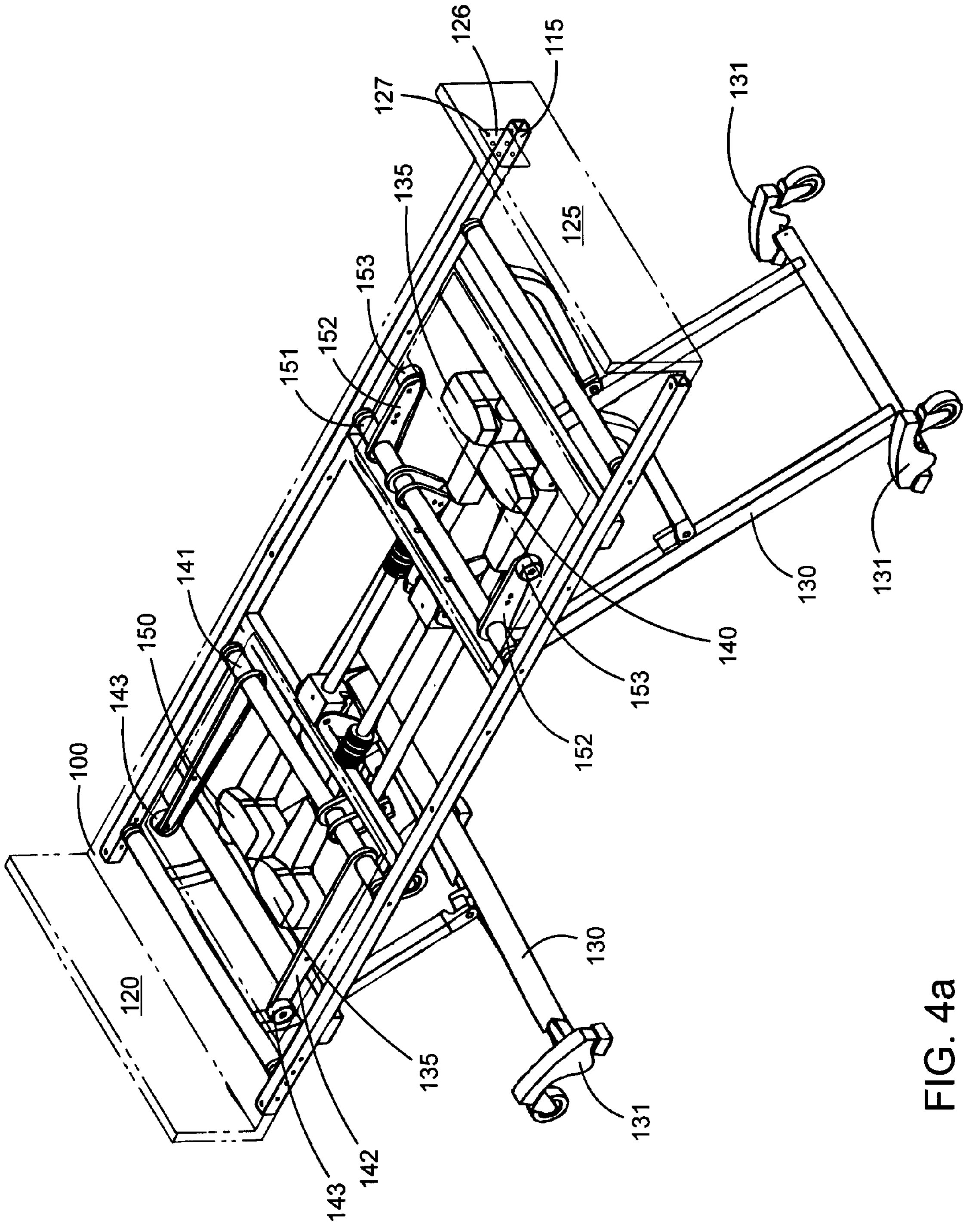
FIG. 4*a* is a perspective view of an electrically operated patient bed comprising the emergency system of FIG. 1.
Figure 4B:
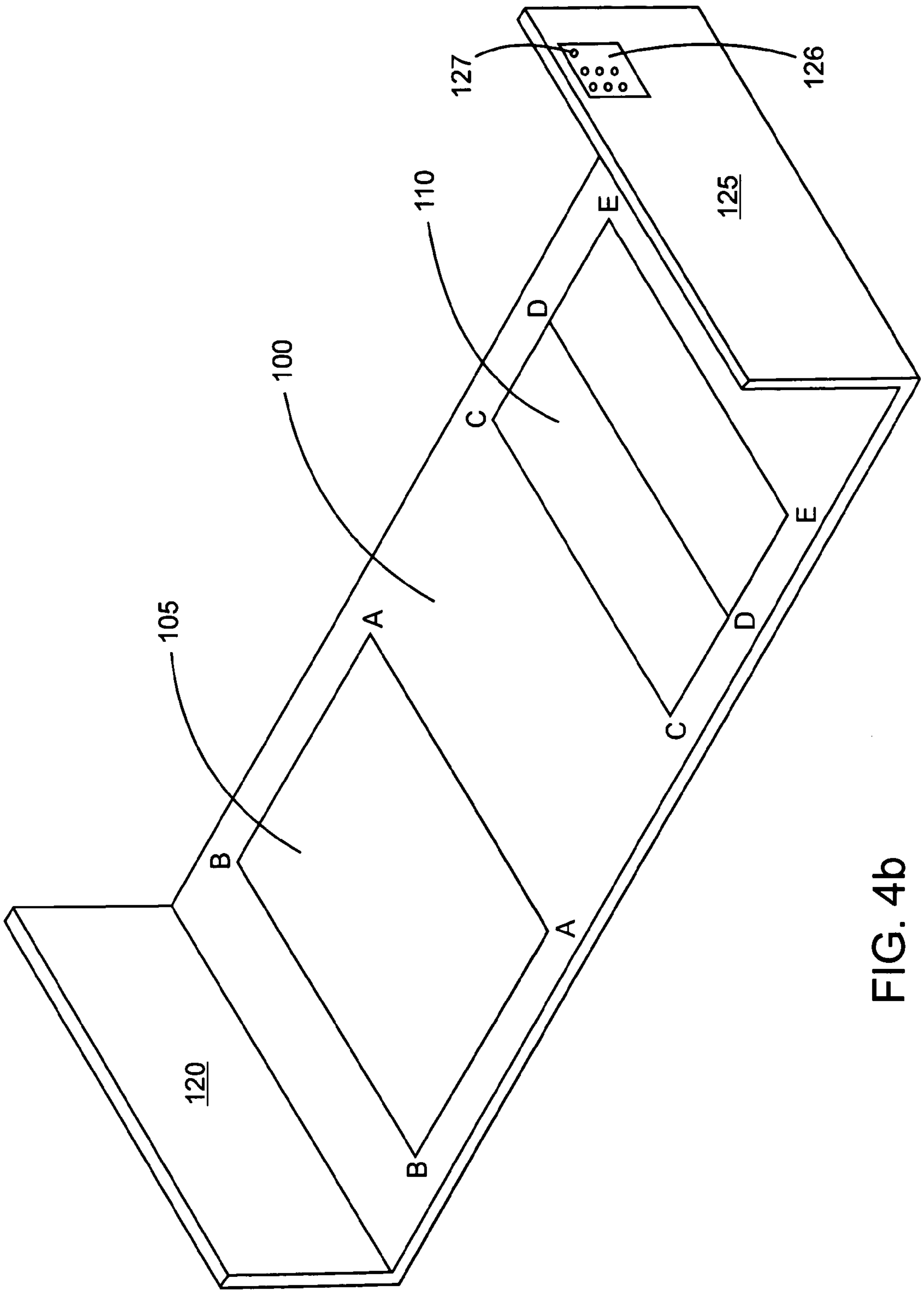
FIG. 4*b* is a schematic perspective view of the patient support platform of the bed depicted in FIG. 4*a;*

Referring to FIGS. 4*a*, 4*b*, 4*c* and 4*d*, an electrically operated patient bed comprising the emergency system of the present invention is shown in which a patient support platform 100 (shown in broken line in FIG. 4*a*), having a back rest portion 105 and a knee rest portion 110, shown in their lowered (flat) positions in FIGS. 4*a* and 4*b*, rests on a bed frame 115. A head board 120 and a foot board 125 are located at the ends of the patient support platform. All switches for electrical activation of bed features are located on a single control panel 126 located on the outside of the foot board 125. The control panel 126 has a single push-button emergency switch 127 dedicated to activating the emergency system.

Pivotally attached to the frame 115 are legs 130 having foot/caster arrangements 131, which support the bed on the floor or ground. Electrically powered linear actuators 135 activated from the control panel 126 operate to raise and lower the bed.

Referring specifically to FIG. 4*b*, the back rest portion 105 is hingedly attached to the support platform 100 along axis A—A. Along axes A—B and B—B, the back rest is not attached to the support platform so that the back rest can be raised to a raised back rest position by pivoting on the axis A—A. The knee rest portion 110 is hingedly attached to the support platform 100 along axis C—C. The knee rest is divided into two sections defined by rectangles C—C—D—D and D—D—E—E respectively. Axis D—D is also hinged to permit the two sections of the knee rest to pivot in respect of each other. Along axes C—E and E—E, the knee rest is not attached to the support platform so that the knee rest can be raised to a raised knee rest position by pivoting on the axes C—C and D—D. The raised back rest and knee rest positions are illustrated in FIGS. 4*c* and 4*d*.

Under normal conditions, raising and lowering of the back rest 105 is accomplished by a first linear actuator 140 activated by momentary contact switches on the control panel 126. The first linear actuator 140 is linked to a transverse back rest pivot element 141 rotationally mounted on the frame 115. Back rest support arms 142 are each fixed at one end to the back rest pivot element 141. Proximal another end of each of the back rest support arms 142 are back rest support wheels 143 rotationally attached to the support arms 142. The back rest 105 rests on the support wheels 143 without being fixedly attached to the back rest support arms 142. When the first linear actuator 140 is activated to raise the back rest 105 by pressing one of the momentary contact switches, the linear actuator rotationally drives the back rest pivot element 141 which causes the back rest support arms 142 to raise which in turn causes the back rest 105 to raise while riding on the back rest support wheels 143. Lowering the back rest 105 requires pressing a separate momentary contact switch which drives the first linear actuator 140 in the reverse direction which permits the back rest to lower. Under normal conditions, raising and lowering the back rest requires continued pressing of the appropriate momentary contact switch by the operator.

Under normal conditions, raising and lowering of the knee rest 110 is accomplished by a second linear actuator 150 activated by momentary contact switches on the control panel 126. The second linear actuator 150 is linked to a transverse knee rest pivot element 151 rotationally mounted on the frame 115. Knee rest support arms 152 are each fixed at one end to the knee rest pivot element 151. Proximal another end of each of the knee rest support arms 152 are knee rest support wheels 153 rotationally attached to the support arms 152. The section of the knee rest 110 described by rectangle C—C—D—D rests on the support wheels 153 without the knee rest 110 being fixedly attached to the knee rest support arms 152. When the second linear actuator 150 is activated to raise the knee rest 110, the linear actuator rotationally drives the knee rest pivot element 151 which causes the knee rest support arms 152 to raise which in turn causes the C—C—D—D section of the knee rest 110 to raise while riding on the knee rest support wheels 153. The D—D—E—E section of the knee rest 110 pivots down along the axis D—D so that the knee rest assumes an inverted V-configuration in the raised position, as illustrated in FIGS. 4*c* and 4*d*. Lowering the knee rest 110 requires pressing a separate momentary contact switch, which drives the second linear actuator 150 in the reverse direction which permits the knee rest to lower. Under normal conditions, raising and lowering the knee rest requires continued pressing of the appropriate momentary contact switch by the operator.

Figure 4C:
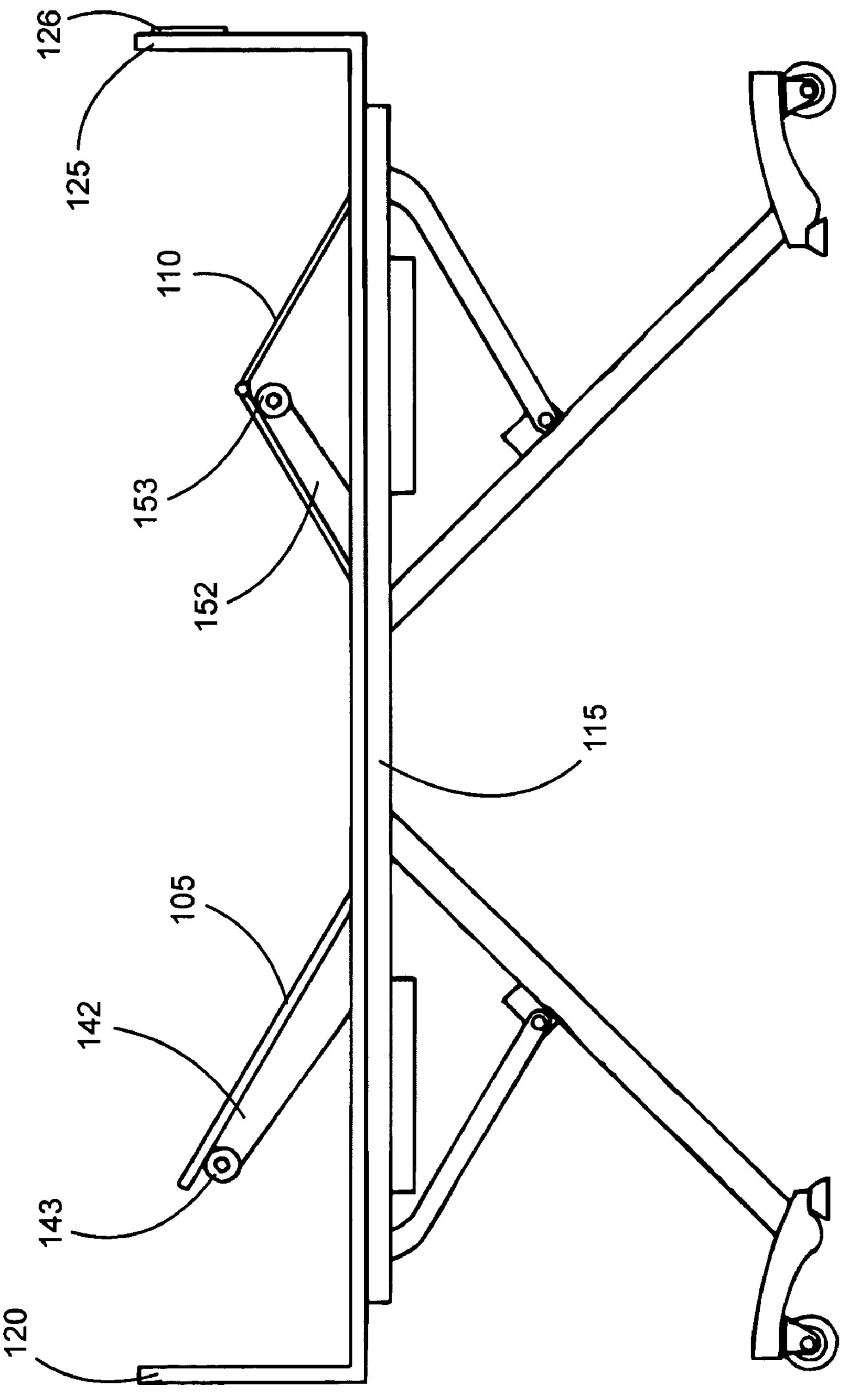
FIG. 4*c* is a schematic side view of a support platform of the bed depicted in FIG. 4*a* in which back and knee rests are in a raised position; and, FIG. 4*d* is a perspective view of the bed depicted in FIG. 4*a* in which back and knee rests are in a raised position.
Figure 4D:
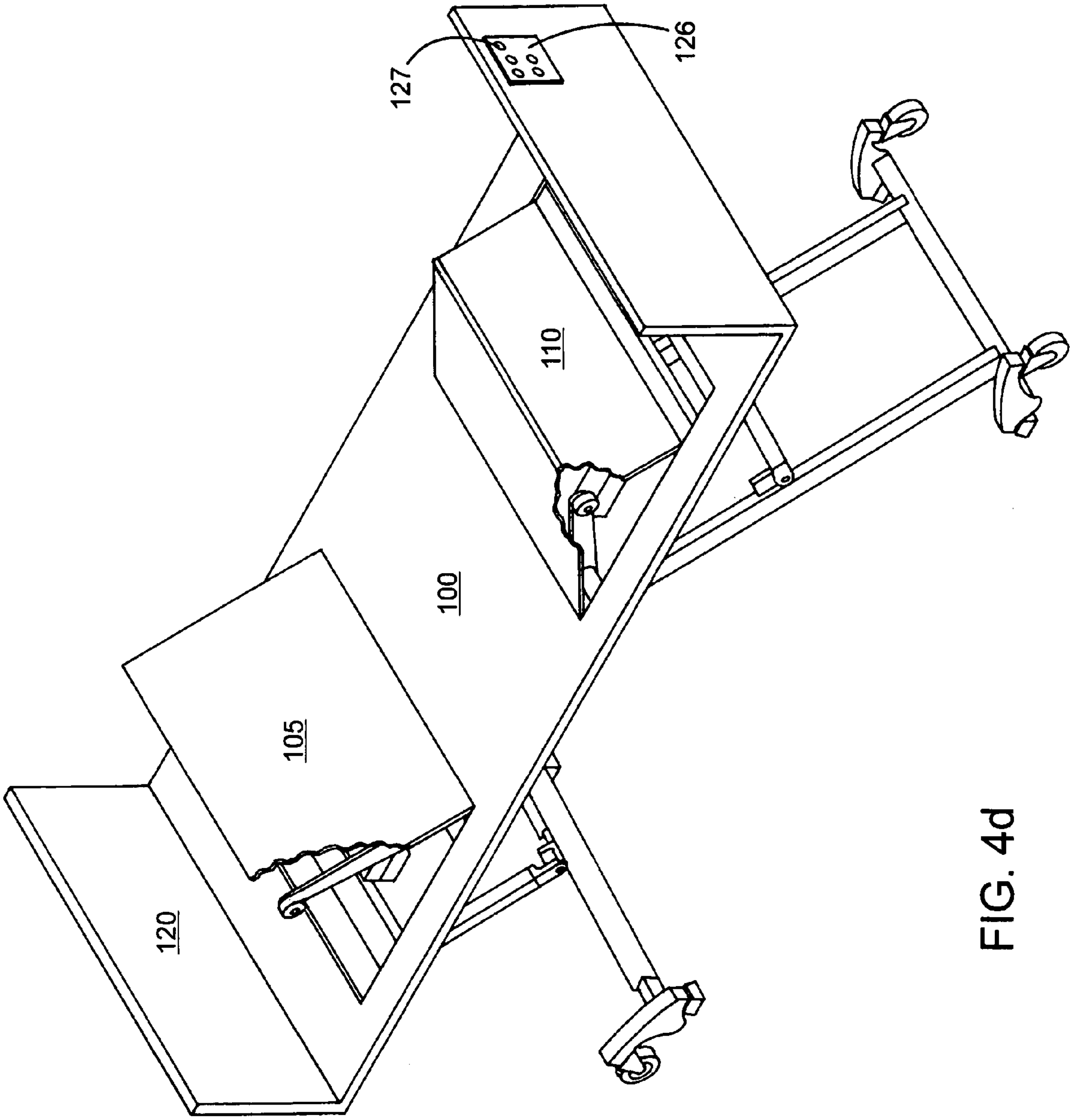

In an emergency situation, with the back rest 105 and the knee rest 110 in the raised position, as depicted in FIGS. 4*c* and 4*d*, an operator may press the emergency switch 127, which is electrically connected to both the first linear actuator 140 and the second linear actuator 150 in a manner as described above with reference to FIG. 1. Thus, pressing the emergency switch 127 causes the linear actuators 140, 150 to operate in the reverse direction and after the operator releases the emergency switch 127, power continues to flow to both of the linear actuators. However, since the linear actuators 140,150 are equipped with disengaging splines as described above with reference to FIGS. 2 and 3, the back and knee rests lower to the flat position under the weight of a patient in the bed, rather than being driven by their respective linear actuators. When the linear actuators reach their fully retracted positions, the switch off. The 15-second time period programmed into the timer is enough time for the back and knee rests to achieve their respective flat positions. During lowering of the back and knee rests the operator is free to begin performing emergency procedures such as CPR. Since the linear actuators 140,150 do not actually drive the back and knee rests, body parts of the operator and/or patient will not be badly hurt if they get caught under the back and/or knee rest.

Other advantages which are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. An emergency system for a patient bed comprising:

(a) an electrically powered linear actuator operable to drive a back rest of the patient bed from a lowered back rest position to a raised back rest position, and operable to permit the back rest to lower from the raised back rest position to the lowered back rest position without being driven by the linear actuator, the linear actuator comprising a lead screw operable for driving a piston rod to raise the back rest when the lead screw operates in an extending direction and further comprising a disengaging element having a spline to permit disengagement of the piston rod from the lead screw when the lead screw operates in a retracting direction; and (b) an independent electrical activation means for activating the linear actuator to permit the back rest to lower from the raised back rest position to the lowered back rest position without being driven by the linear actuator, the electrical activation means not requiring continued operator attendance for continued lowering of the back rest.

2. The emergency system of claim 1, wherein the electrical activation means comprises a switch, whereby triggering the switch activates the linear actuator to permit the back rest to lower from the raised back rest position to the lowered back rest position without being driven by the linear actuator and without requiring continued operator attendance for continued lowering of the back rest.

3. The emergency system according to claim 2, wherein the electrical activation means further comprises a timer for continuing to provide a signal so that the linear actuator is powered for at least a maximum time required for the back rest to achieve the lowered back rest position.

4. The emergency system according to claim 1, wherein the electrical activation means further activates a second electrically powered linear actuator to permit a knee rest to lower from a raised knee rest position to a lowered knee rest position without being driven by the second linear actuator, the electrical activation means not requiring continued operator attendance for continued lowering of the knee rest.

5. A patient bed comprising a patient support platform having a back rest portion; an electrically powered linear actuator operable to drive the back rest from a lowered back rest position to a raised back rest position, characterized in that the linear actuator is operable to permit the back rest to lower from the raised back rest position to the lowered back rest position without being driven by the linear actuator, the linear actuator comprising a lead screw operable for driving a piston rod to raise the back rest when the lead screw operates in an extending direction and further comprising a disengaging element having a spline to permit disengagement of the piston rod from the lead screw when the lead screw operates in a retracting direction; and, the bed further comprises an emergency back rest lowering system comprising an independent electrical activation means for activating the linear actuator to permit the back rest to lower from the raised back rest position to the lowered back rest position without being driven by the linear actuator, the electrical activation means not requiring continued operator attendance for continued lowering of the back rest.

6. The patient bed according to claim 5, wherein the electrical activation means comprises a switch, whereby triggering the switch activates the linear actuator to permit the back rest to lower from the raised back rest position to the lowered back rest position without being driven by the linear actuator and without requiring continued operator attendance for continued lowering of the back rest.

7. The patient bed according to claim 6, wherein the electrical activation means comprises a timer for continuing to provide a signal so that the linear actuator is powered for at least a maximum time required for the back rest to achieve the lowered back rest position.

8. The patient bed according to claim 7, wherein the lowered back rest position is flat with respect to the patient support platform.

9. The patient bed according to claim 8, wherein the patient support platform further comprises a knee rest portion, and wherein the electrical activation means further activates a second linear actuator to permit the knee rest to lower from a raised knee rest position to a lowered knee rest position without being driven by the second linear actuator, the electrical activation means not requiring continued operator attendance for continued lowering of the knee rest.

10. The patient bed according to claim 9, wherein the lowered knee rest position is flat with respect to the patient support platform.

11. An emergency cardiopulmonary resuscitation system for a patient bed comprising:

(a) an electrically powered linear actuator comprising a lead screw operable for driving a piston rod to raise a back rest when the lead screw operates in an extending direction, and further comprising a spline to permit disengagement of the piston rod from the lead screw when the lead screw operates in a retracting direction to permit the back rest to lower from a raised hack rest position to a lowered back rest position without being driven by the linear actuator; and, (b) an independent electrical activation means comprising a switch, whereby triggering the switch activates the linear actuator to operate in the retracting direction, and further comprising a timer for continuing to provide a signal so that the linear actuator is powered for at least a maximum time required for the back rest to achieve the lowered back rest position to thereby permit continued lowering of the back rest without requiring continued operator attendance to the activation means, the electrical activation means further activating a second electrically powered linear actuator to permit a knee rest to lower from a raised knee rest position to a lowered knee rest position without being driven by the second linear actuator, the electrical activation means not requiring continued operator attendance for continued lowering of the knee rest.

12. The emergency cardiopulmonary resuscitation system according to claim 11, wherein the second electrically powered linear actuator comprises a lead screw operable for driving a piston rod to raise the knee rest when the lead screw operates in an extending direction, and further comprises a spline to permit disengagement of the piston rod from the lead screw when the lead screw operates in a retracting direction to permit the knee rest to lower from a raised knee rest position to a lowered knee rest position without being driven by the linear actuator, and wherein the timer continues to provide a signal so that the linear actuator is powered for at least a maximum time required for the knee rest to achieve the lowered knee rest position to thereby permit continued lowering of the knee rest without requiring continued operator attendance to the activation means.

* * * * *

UNITED STATES PATENT AND TRADEMARK OFFICE

CERTIFICATE OF CORRECTION

PATENT NO. : 7,055,195 B2
APPLICATION NO. : 10/875335
DATED : June 6, 2006
INVENTOR(S) : Richard A. Roussy It is certified that error appears in the above-identified patent and that said Letters Patent is hereby corrected as shown below:

Col. 10, Line 28, Claim 11 - Please delete -- hack -- and insert -- back -- after from a raised

Signed and Sealed this

Twenty-second Day of August, 2006

JON W. DUDAS
*Director of the United States Patent and Trademark Office*